US011553026B2

(12) United States Patent
Trim et al.

(10) Patent No.: US 11,553,026 B2
(45) Date of Patent: Jan. 10, 2023

(54) REGULATING CONTENT ASSOCIATED WITH A STREAMING PLATFORM

(71) Applicant: International Business Machines Corporation, Armonk, NY (US)

(72) Inventors: Craig M. Trim, Ventura, CA (US); Cesar Augusto Rodriguez Bravo, San Rafael de Alajuela (CR); Jeremy R. Fox, Georgetown, TX (US); Zachary A. Silverstein, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 16/423,106

(22) Filed: May 27, 2019

(65) Prior Publication Data

US 2020/0382573 A1    Dec. 3, 2020

(51) Int. Cl.
*H04N 21/8358*    (2011.01)
*H04L 65/75*    (2022.01)
(Continued)

(52) U.S. Cl.
CPC .......... *H04L 65/765* (2022.05); *G06N 20/00* (2019.01); *G06V 20/46* (2022.01); *G06V 20/52* (2022.01);
(Continued)

(58) Field of Classification Search
CPC ................................................. G06K 9/00744
See application file for complete search history.

(56) References Cited

U.S. PATENT DOCUMENTS 7,006,630 B2 *   2/2006   Yu ........................ H04N 5/913
                                                                    348/14.01
9,667,639 B1    5/2017   Pierson et al.
(Continued)

FOREIGN PATENT DOCUMENTS

WO    2015048338 A1    4/2015

OTHER PUBLICATIONS

"Les Miserables Live—Curtain Call and One Day More (Reprise)" (i.e., CurtainCall video), Published Jun. 29, 2017, Available online at <https://www.youtube.com/watch?v=-jlbp-4CVNg>.*
(Continued)

*Primary Examiner* — Brian T Pendleton
*Assistant Examiner* — Frank Johnson
(74) *Attorney, Agent, or Firm* — The Steadman Law Firm PLLC

(57) ABSTRACT

Techniques are described with respect to management of streaming content. An associated computer-implemented method includes registering an event with a streaming platform and detecting from a client system of a streaming contributor unsanctioned streaming content captured from the event. The computer-implemented method further includes determining whether a selected portion of the unsanctioned streaming content includes a token associated with the event. Responsive to determining that the selected portion of the unsanctioned streaming content includes the token, the computer-implemented method further includes regulating the unsanctioned streaming content according to a media infringement policy implemented by the streaming platform. According to an embodiment, the token is a barcode or a visual representation included on at least one artifact placed at a site of the event.

19 Claims, 8 Drawing Sheets

(51) Int. Cl.
*H04N 21/8352* (2011.01)
*H04N 21/234* (2011.01)
*G06N 20/00* (2019.01)
*G06V 20/40* (2022.01)
*G06V 20/52* (2022.01)

(52) U.S. Cl.
CPC ... *H04N 21/23424* (2013.01); *H04N 21/8352* (2013.01)

(56) References Cited

U.S. PATENT DOCUMENTS

| | | | | |
|---|---|---|---|---|
| 9,779,232 | B1 | 10/2017 | Paczkowski et al. | |
| 10,009,663 | B1* | 6/2018 | Hoffman | H04N 21/8358 |
| 2001/0008557 | A1* | 7/2001 | Stefik | G06T 1/0021 |
| | | | | 380/202 |
| 2002/0090114 | A1* | 7/2002 | Rhoads | G06K 7/1447 |
| | | | | 375/E7.076 |
| 2002/0147910 | A1* | 10/2002 | Brundage | H04N 1/32144 |
| | | | | 713/176 |
| 2004/0046871 | A1* | 3/2004 | Ichikawa | H04N 21/4524 |
| | | | | 348/207.99 |
| 2005/0007456 | A1* | 1/2005 | Lee | H04N 1/00973 |
| | | | | 348/207.99 |
| 2005/0169496 | A1* | 8/2005 | Perry | G06F 21/79 |
| | | | | 382/100 |
| 2006/0005029 | A1* | 1/2006 | Petrovic | H04N 5/913 |
| | | | | 713/176 |
| 2007/0071322 | A1* | 3/2007 | Maltagliati | H04N 21/8358 |
| | | | | 382/181 |
| 2007/0140488 | A1* | 6/2007 | Dharmaji | H04N 21/8355 |
| | | | | 380/212 |
| 2007/0240234 | A1* | 10/2007 | Watson | H04N 5/913 |
| | | | | 726/32 |
| 2008/0195664 | A1* | 8/2008 | Maharajh | H04L 67/306 |
| 2008/0279376 | A1* | 11/2008 | Jin | G11B 20/00427 |
| | | | | 380/37 |
| 2009/0158443 | A1* | 6/2009 | Dias | H04N 21/8358 |
| | | | | 726/32 |
| 2009/0288170 | A1* | 11/2009 | Osawa | G06T 1/0028 |
| | | | | 726/26 |
| 2010/0067692 | A1* | 3/2010 | Schultz | H04N 21/4405 |
| | | | | 713/150 |
| 2010/0122280 | A1* | 5/2010 | Sotos | H04N 21/25841 |
| | | | | 725/25 |
| 2010/0223477 | A1* | 9/2010 | Onoda | H04N 21/8358 |
| | | | | 713/189 |
| 2013/0151855 | A1* | 6/2013 | Petrovic | H04N 21/8358 |
| | | | | 713/176 |
| 2013/0167170 | A1* | 6/2013 | Klappert | H04N 21/41265 |
| | | | | 725/25 |
| 2015/0016661 | A1* | 1/2015 | Lord | H04L 51/10 |
| | | | | 382/100 |
| 2015/0302886 | A1* | 10/2015 | Brock | H04L 63/0263 |
| | | | | 726/32 |
| 2016/0034704 | A1* | 2/2016 | Shim | H04N 5/23229 |
| | | | | 726/26 |
| 2016/0127641 | A1 | 5/2016 | Gove | |
| 2016/0225131 | A1 | 8/2016 | Babbar | |
| 2016/0232685 | A1* | 8/2016 | Hefetz | G06T 7/90 |
| 2016/0247423 | A1* | 8/2016 | Hohl | G11B 27/036 |
| 2017/0026680 | A1* | 1/2017 | Sugio | H04N 21/2187 |
| 2017/0064246 | A1* | 3/2017 | Kline | G11B 20/00086 |
| 2017/0206416 | A1* | 7/2017 | Chen | G06T 7/00 |
| 2020/0258542 | A1* | 8/2020 | Belshaw | G03B 21/32 |

OTHER PUBLICATIONS

Bai, Xiaolong et al. Picking Up My Tab: Understanding and Mitigating Synchronized Token Lifting and Spending in Mobile Payment. Proceedings of the 26th USENIX Security Symposium, Aug. 16-18, 2017, Vancouver, Canada, pp. 593-608.

Rafique, M. Zubair et al. It's Free for a Reason: Exploring the Ecosystem of Free Live Streaming Services. NDSS '16, Feb. 21-24, 2016, San Diego, CA, USA, pp. 1-15.

LiveTalk, LiveTalk.tech, version 2, Aug. 30, 2018 [26 pages]. <https://livetalk.tech/WhitePaperLiveTalk.pdf>.

Determining demographic information, location likelihood of fraud, and interests based on IP address, user agent, and ISP. IP.com, IPCOM000220073D, Jul. 20, 2012 [5 pages].

IBM, Method to Detect Potential Virtual Universe Fraud. IP.com, IPCOM000179131D, Feb. 6, 2009 [3 pages].

Good, Owen S. UFC pay-per-view streamed on Twitch by a guy pretending it was a video game. Polygon.com, Dec. 4, 2017 [3 printed pages] <https://www.polygon.com/2017/12/4/16733386/ufc-pay-per-view-streamed-on-twitch-by-a-guy-pretending-it-was-a-video-game>.

Invisible QR Codes. barcoding.com, Sep. 14, 2012 [1 printed page] <https://www.barcoding.com/blog/invisible-qr-codes>.

Moreno, Joaquin Caraballo et al. Live Streaming on a Peer-to-Peer Overlay: Implementation and Validation. ICN'05 Proceedings of the 4th international conference on Networking—vol. Part II, Reunion Island, France, Apr. 17-21, 2005, pp. 625-633.

Dore, Craig. Provisioning RSA Software Tokens via QR Code. RSA Link Team, Jan. 6, 2017 [2 printed pages, 1 embedded video—03 min, 30 sec] <https://community.rsa.com/videos/24273>.

* cited by examiner

REGULATING CONTENT ASSOCIATED WITH A STREAMING PLATFORM

BACKGROUND

The various embodiments described herein generally relate to management of streaming content. More specifically, the various embodiments describe techniques of regulating unsanctioned streaming content associated with a streaming platform in the context of an event.

The emergence of streaming media technology along with the increasing prevalence of portable devices capable of capturing high quality audiovisual content has enabled broadcasting of events that otherwise would not be readily available in the public domain. Unsanctioned broadcasts of such events may impede upon intellectual property rights and/or privacy rights of event hosts and other interested parties.

SUMMARY

The various embodiments described herein provide techniques of regulating streaming content. Regulating streaming content according to the various embodiments may prevent dissemination of pirated or otherwise unauthorized streaming content. An associated computer-implemented method includes registering an event with a streaming platform and detecting from a client system of a streaming contributor unsanctioned streaming content captured from the event. The computer-implemented method further includes determining whether a selected portion of the unsanctioned streaming content includes a token associated with the event. Responsive to determining that the selected portion of the unsanctioned streaming content includes the token, the computer-implemented method further includes regulating the unsanctioned streaming content according to a media infringement policy implemented by the streaming platform. In an embodiment, the token is a barcode. According to such embodiment, the step of determining that the unsanctioned streaming content includes the token includes detecting the barcode within the unsanctioned streaming content via a scanning application. In a further embodiment, the token is a visual representation. According to such further embodiment, determining that the unsanctioned streaming content includes the token comprises detecting the visual representation within the unsanctioned streaming content via an image recognition application.

In an embodiment, the step of registering the event with the streaming platform includes receiving from a host of the event a streaming management request, issuing the token to the host, and facilitating placement of at least one artifact including the token at a site of the event. Optionally, the step of registering the event with the streaming platform further includes training a machine learning knowledge model associated with the streaming platform by recording a plurality of datapoints associated with the event. Optionally, the step of registering the event with the streaming platform further includes conveying to the host streaming rights associated with the event. In a further embodiment, the step of facilitating placement of the at least one artifact includes facilitating printing of the at least one artifact. In a further embodiment, the step of facilitating placement of the at least one artifact includes facilitating digital projection of the at least one artifact.

In an embodiment, the step of determining whether the selected portion of the unsanctioned streaming content includes the token comprises, responsive to determining that a sampled frame among the unsanctioned streaming content is captured at a detection rate exceeding a predefined frame detection rate threshold, determining whether at least one image within the sampled frame is identifiable beyond a predetermined threshold level of confidence. According to such embodiment, the step of determining whether the selected portion of the unsanctioned streaming content includes the token further comprises, responsive to determining that at least one image within the sampled frame is identifiable beyond the predetermined threshold level of confidence, determining whether the at least one image includes the token. In a further embodiment, the step of determining whether at least one image within the sampled frame is identifiable beyond the predetermined threshold level of confidence comprises examining datapoints associated with a site of the event via a machine learning knowledge model associated with the streaming platform, identifying any image within the sampled frame based upon the datapoint examination, and, responsive to determining that at least one image within the sampled frame is identified beyond the predetermined threshold level of confidence, updating the datapoints associated with the site of the event based upon aspects of the at least one identified image. In a further embodiment, the step of determining whether the at least one image includes the token comprises examining datapoints associated with the token via a machine learning knowledge model associated with the streaming platform and, responsive to determining based upon the datapoint examination that the token is identifiable within any image among the at least one image beyond the predetermined threshold level of confidence, updating the datapoints associated with the token based upon frame capture details related to the token.

In an embodiment, the step of regulating the unsanctioned streaming content includes inserting at least one promotional segment into the unsanctioned streaming content. In a further embodiment, the step of regulating the unsanctioned streaming content includes disabling the unsanctioned streaming content for a predefined blockage period. In a further embodiment, the step of regulating the unsanctioned streaming content includes transmitting to the client system of the streaming contributor a notification indicating blockage of the unsanctioned streaming content upon expiration of a predefined warning period. In a further embodiment, the step of regulating the unsanctioned streaming content includes blocking the unsanctioned streaming content until the streaming contributor is beyond a predefined geographic range associated with the event. In a further embodiment, the step of regulating the unsanctioned streaming content includes blocking the unsanctioned streaming content until the streaming contributor changes a direction or an angle from which the unsanctioned streaming content is captured by a predetermined degree.

One or more additional embodiments include a computer program product including a computer readable storage medium having program instructions embodied therewith. According to such embodiment(s), the program instructions may be executable by a computing device to cause the computing device to perform one or more steps of above recited computer-implemented method. One or more further embodiments include a system having a processor and a memory storing an application program, which, when executed on the processor, performs one or more steps of the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
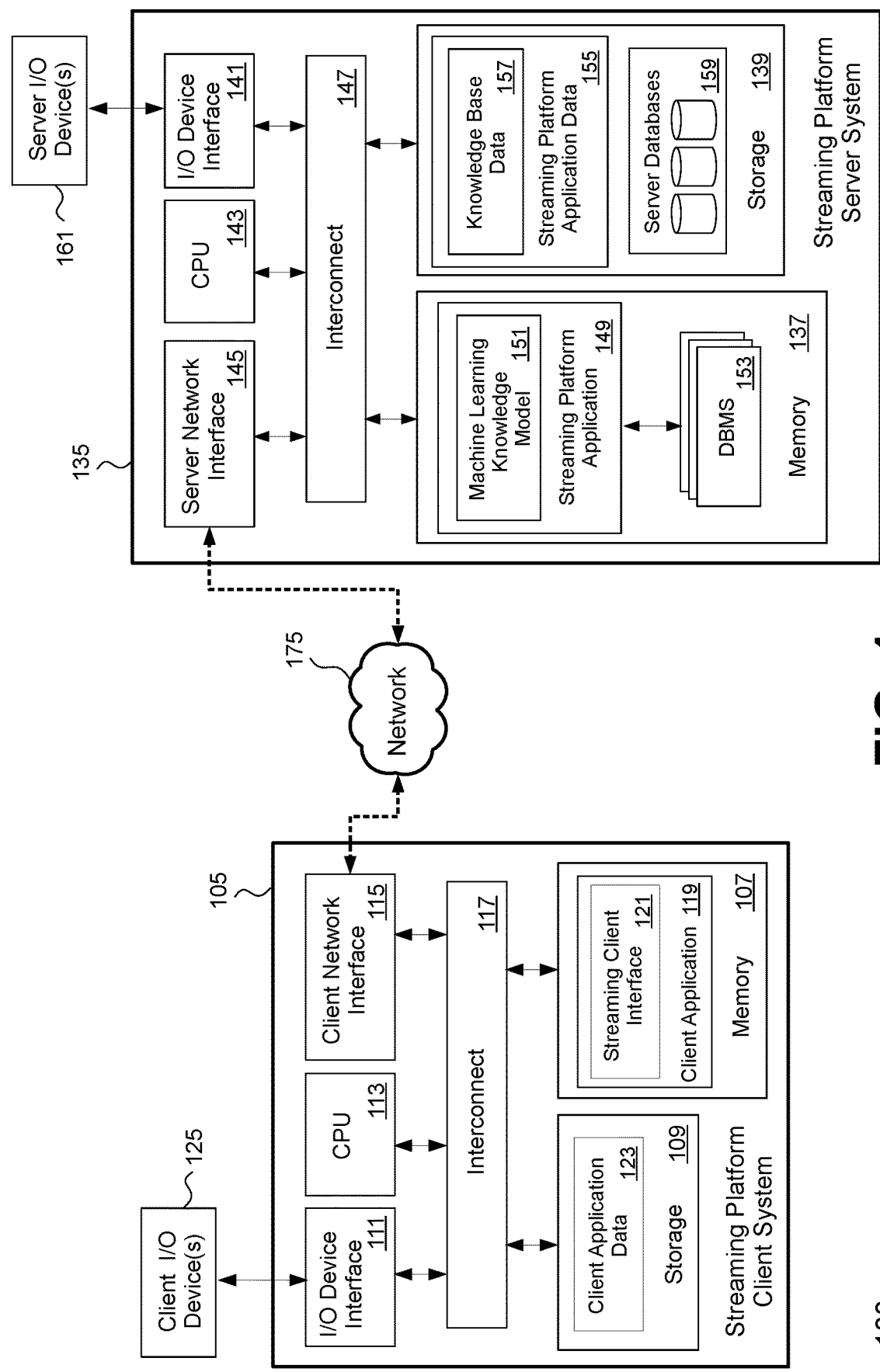
FIG. 1 illustrates a computing infrastructure associated with a streaming platform, according to one or more embodiments.

The various embodiments described herein are directed to techniques of managing streaming content associated with a streaming platform. A streaming platform server system configured to implement techniques associated with the various embodiments described herein may regulate unsanctioned streaming content broadcasted from an event site.

The various embodiments described herein may have advantages over conventional techniques. The various embodiments may improve computer technology by regulating dissemination of both sanctioned streaming content and unsanctioned streaming content associated with an event, e.g., a sports game or a cultural performance. More specifically, by registering an event with a streaming platform, the various embodiments may facilitate propagation of sanctioned streaming content by a host of such event or by one or more other parties to which the host conveys streaming rights. Furthermore, the various embodiments may block or limit distribution of unsanctioned streaming content associated with an event per a defined policy in order to address pirated or otherwise unauthorized streaming. Additionally or alternatively, the various embodiments may regulate distribution of unsanctioned streaming content by providing a streaming contributor an option to insert one or more promotional segments therein. Additionally or alternatively, the various embodiments may regulate distribution of unsanctioned streaming content by requiring a streaming contributor to comply with one or more conditions in order to avoid or end content blockage. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to regulating streaming content. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100 associated with a streaming platform, according to one or more embodiments. In an embodiment, a streaming platform in the context of the various embodiments described herein includes a plurality of streaming services. According to such embodiment, the plurality of streaming services includes a consortium of streaming services collaborating for purposes of efficiency and/or piracy prevention. Alternatively, a streaming platform in the context of the various embodiments includes a single streaming service. As shown, computing infrastructure 100 includes a streaming platform client system 105 and a streaming platform server system 135, each connected to a communications network 175.

Illustratively, client system 105 includes, or is otherwise operatively coupled to, a memory 107, storage 109, an input/output (I/O) device interface 111, a central processing unit (CPU) 113, and a client network interface 115, all of which are interconnected via interconnect 117 (e.g., a bus). One or more aspects of client system 105 are accessed or controlled by one or more streaming clients, such as a streaming contributor or a streaming recipient. In an embodiment, client system 105 is a portable client device capable of receiving, recording, and/or streaming audiovisual content (e.g., a mobile device). Although shown as a single computing system, client system 105 is included to be representative of a single client or multiple clients. In an embodiment, client system 105 is a thin client. Memory 107 includes a client application 119. Client application 119 may be an online streaming application configured for interfacing with server system 135 and other computing systems. Client application 119 includes a streaming client interface 121. Streaming client interface 121 includes a graphical user interface (GUI), a command line interface, and/or a sensory interface (e.g., capable of discerning client sound/voice commands). One or more components of a GUI, a command line interface, or a sensory interface included in streaming client interface 121 may facilitate client input and/or may facilitate display of application data. In the event of multiple clients, multiple instances of client system 105 may be present, each of which having a respective client application 119 including at least one respective streaming client interface 121. Storage 109 includes client application data 123 associated with client application 119. I/O device interface 111 is communicatively coupled to one or more client I/O devices 125 (e.g., touchscreen console, trackpad, joystick, microphone, speaker, etc.). One or more streaming clients associated with client system 105 may contribute to or otherwise interact with streaming client interface 121 via the one or more client I/O devices 125. CPU 113 is included to be representative of a single CPU, multiple CPUs, a single CPU having multiple processing cores, and the like. Client network interface 115 is configured to receive data from and transmit data to server system 135 via network 175.

In an embodiment, server system 135 includes a single hardware server configured to provide streaming platform hosting capabilities. In an alternative embodiment, server system 135 includes, or is otherwise operatively coupled to, a plurality of hardware and/or virtualized servers configured to provide streaming platform hosting capabilities. In a further alternative embodiment, server system 135 is a cloud server system configured to provide distributed streaming platform hosting capabilities via a plurality of cloud computing nodes in a cloud computing environment. According to such further alternative embodiment, the plurality of cloud computing nodes are configured to communicate with one another. Additionally, according to such further alternative embodiment, such cloud computing environment optionally offers infrastructure, platforms, and/or software as a service capabilities for which client system 105 or other systems associated with computing infrastructure 100 need not maintain resources locally.

Illustratively, server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes a streaming platform application 149. Streaming platform application 149 is configured to manage streaming content according to the various embodiments described herein. Streaming platform application 149 includes or is otherwise operatively coupled to a machine learning knowledge model representation 151. In an embodiment, streaming platform application 149 is configured to execute one or more artificial intelligence algorithms utilizing one or more machine learning techniques via machine learning knowledge model representation 151. According to such embodiment, machine learning knowledge model representation 151 includes or is otherwise operatively coupled to a machine learning knowledge model and at least one knowledge base associated therewith. According to such embodiment, all or some aspects of the machine learning knowledge model may be run within server system 135. Additionally or alternatively, all or some aspects of machine learning knowledge model may be run externally to server system 135, e.g., via a cloud-based implementation, in which case server system 135 communicates with the machine learning knowledge model via machine learning knowledge model representation 151. Server system 135 further includes a database management system (DBMS) 153. DBMS 153 is included to be representative of a single database system or multiple database systems. In an embodiment, streaming platform application 149 facilitates authentication of client system 105 and/or other client systems in computing infrastructure 100. In an alternative embodiment, streaming platform application 149 sends authentication information associated with client system 105 and/or other client systems to an external directory server system (not shown in FIG. 1), which may in turn perform or otherwise facilitate any necessary authentication steps.

Storage 139 includes streaming platform application data 155. Streaming platform application 149 generates and processes streaming platform application data 155 based on interaction with other components of computing infrastructure 100. To address requests or to otherwise complete tasks with respect to image processing, streaming platform application 149 optionally initiates or otherwise facilitates an application programming interface (API) call to an application having image processing capabilities, e.g., a local server-based image processing application and/or a cloud-based image processing application (not shown in FIG. 1). To address requests or to otherwise complete tasks with respect to audiovisual processing, streaming platform application 149 optionally initiates or otherwise facilitates an API call to an application having audiovisual processing capabilities, e.g., a local server-based audiovisual processing application and/or a cloud-based audiovisual processing application (not shown in FIG. 1). Streaming platform application data 155 includes knowledge base data 157 generated by and/or used by the machine learning knowledge model. In an embodiment, knowledge base data 157 includes data associated with at least one knowledge base, which optionally is incorporated into aspects of server system 135 and/or optionally is externally located and communicatively coupled to server system 135. Knowledge base data 157 optionally includes datapoints associated with an event registered with the streaming platform. Storage 139 further includes server databases 159. DBMS 153 includes or interfaces with a software application configured to manage server databases 159. In an embodiment, server databases 159 include one or more relational databases. In an additional embodiment, server databases 159 include one or more ontology trees or other ontological structures. While FIG. 1 illustrates three databases 159, server system 135 (and more generally computing infrastructure 100) may include any number of databases. According to a further embodiment, DBMS 153 sends requests to remote databases (not shown) via network 175.

I/O device interface 141 is communicatively coupled to one or more server I/O devices 161. CPU 143 is included to be representative of a single CPU, multiple CPUs, a single CPU having multiple processing cores, and the like. Server network interface 145 is configured to receive data from and transmit data to client system 105 or other client system(s) via network 175. Specifically, streaming platform application 149 is configured to accept requests sent by client system 105 or other client system(s) to server system 135 and is configured to transmit data to client system 105 or other client system(s) via server network interface 145.

Figure 2:
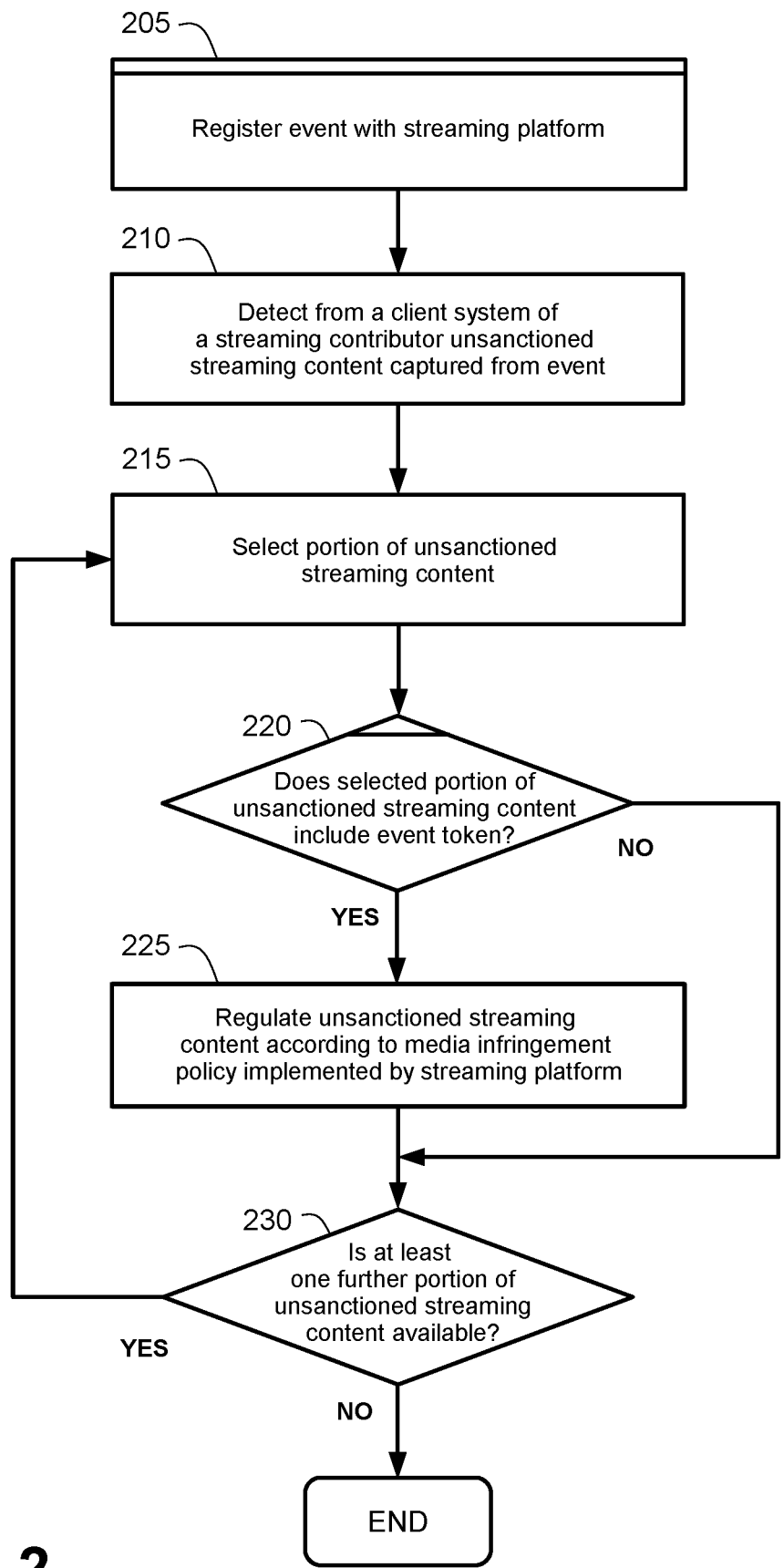
FIG. 2 illustrates a method of regulating content associated with a streaming platform, according to one or more embodiments.

FIG. 2 illustrates a method 200 of managing content associated with a streaming platform. One or more steps associated with the method 200 and the other methods described herein may be carried out in a client-server computing environment (e.g., computing infrastructure 100) associated with the streaming platform. Such environment includes a network (e.g., network 175). A streaming platform application in a streaming platform server system of the client-server computing environment (e.g., streaming platform application 149 in server system 135 of computing infrastructure 100) facilitates processing according to the method 200 and the other methods further described herein. The streaming platform application interacts with one or more streaming clients via one or more respective streaming client interfaces of one or more streaming client systems (e.g., streaming client interface 121 of streaming platform client system 105). The one or more streaming clients include streaming contributors and/or streaming recipients. Additionally or alternatively to the client-server computing environment, one or more steps associated with the method 200 and the other methods described herein may be carried out within one or more workloads of a cloud computing environment associated with the streaming platform. Additionally or alternatively, one or more steps associated with the method 200 and the other methods described herein may be carried out in a peer-to-peer network environment associated with the streaming platform, in which case one or more of the method steps described herein may be carried out via a peer application of a peer computing system.

The method 200 begins at step 205, where the streaming platform application registers an event with the streaming platform. As further described herein, the streaming platform application registers the event at the request of a host of the event. In the context of the various embodiments described herein, an event host is an entity (e.g., an individual, a group of individuals, an organization, etc.) having organizational responsibility for the event and/or having intellectual property rights associated with the event. In an embodiment, the streaming platform includes a plurality of streaming services, e.g., a consortium of streaming services. In an alternative embodiment, the streaming platform includes a single streaming service. As further described herein, the streaming platform application manages streaming content by determining presence of a token included on at least one artifact placed at a site of the event, i.e., a locale at which the event is held. In the context of the various embodiments described herein, the token is specifically associated with the event and serves as a form of marker that enables the streaming platform to detect capture of streaming content at the event site, and an artifact is a medium through which the token is presented. A method with regard to registering an event with the streaming platform in accordance with step 205 is described with respect to FIG. 3.

At step 210, the streaming platform application detects from a streaming client system of a streaming contributor (e.g., a streaming client device such as a mobile phone) unsanctioned streaming content captured from the event. According to step 210, the streaming platform application detects the unsanctioned streaming content captured from the event and further detects that the unsanctioned streaming content is disseminated from the streaming client system of the streaming contributor. Optionally the streaming contributor captures the unsanctioned streaming content directly via the streaming client system of the streaming contributor (e.g., via an audiovisual capture device such as a camera or other media recorder). Alternatively, in the event that the streaming contributor does not capture the unsanctioned streaming content directly but rather obtains the unsanctioned streaming content from another entity, the streaming contributor optionally receives the unsanctioned streaming content from the other entity and disseminates the unsanctioned streaming content upon receipt. In the context of the various embodiments described herein, a streaming contributor is an entity at an event (e.g., a spectator) capable of capturing and/or disseminating streaming media associated with the event for broadcast or other public distribution. For instance, the streaming contributor may capture and/or disseminate streaming media to upload or otherwise contribute to a streaming service that is associated with the streaming platform or that is otherwise in communication with the streaming platform. In an embodiment, the streaming contributor is a client of the streaming platform and/or is a client of a streaming service included within the streaming platform. Additionally or alternatively, the streaming contributor is a client of a streaming service having a collaborative relationship with the streaming platform. In a further embodiment, the streaming platform application detects information with regard to the streaming client system of the streaming contributor, including identity datapoints and/or location thereof. With regard to the location of the streaming client system of the streaming contributor, the streaming platform application optionally obtains an absolute location (e.g., Global Positioning System (GPS) location) of such system and/or a location of such system relative to the event site.

In the context of the various embodiments described herein, unsanctioned streaming content addressed by the streaming platform includes any streaming content associated with the event that is not explicitly authorized or otherwise approved by the event host, e.g., streaming content captured and/or disseminated without the knowledge and/or permission of the event host. In an embodiment, the unsanctioned streaming content detected by the streaming platform application at step 210 includes one or more portions of live content captured in real time. Additionally or alternatively, the unsanctioned streaming content includes one or more portions of recorded content captured during a previous duration of time. In an embodiment, the streaming platform application detects the unsanctioned streaming content based upon one or more content uploads to the streaming platform received from the streaming client system of the streaming contributor. In a further embodiment, in the event that the streaming contributor is associated with another streaming platform or is otherwise disseminating the content, the streaming platform application detects the unsanctioned streaming content by obtaining access to, or by obtaining metadata with respect to, the unsanctioned streaming content from the other source. According to such embodiment, another streaming platform may share access to, or may share metadata with respect to, the unsanctioned streaming content, e.g., in the context of a collaborative piracy prevention initiative. Additionally or alternatively, the streaming platform application obtains access to, or obtains metadata with respect to, the unsanctioned streaming content via an alternative form of broadcast, e.g., over-the-air radio or television accessible by analog and/or digital antenna.

At step 215, the streaming platform application selects a portion of the unsanctioned streaming content for analysis. The streaming platform application selects the portion from live content newly captured in real time and/or from previously recorded content. In an embodiment, the streaming platform application determines a size of the selected portion based upon one or more sampling requirements designated by the streaming platform. In a further embodiment, the streaming platform application determines a size of the selected portions (and optionally other portion(s)) at the frame level, i.e., on a frame-by-frame basis. At step 220, the streaming platform application determines whether the selected portion of the unsanctioned streaming content includes the token associated with the event. By determining whether the selected portion of the unsanctioned streaming content includes the token, the streaming platform application may determine whether the streaming contributor is capturing and/or disseminating streaming content of the event without prior authorization from the event host. A method with regard to determining whether the selected portion of the unsanctioned streaming content includes the token associated with the event in accordance with step 220 is described with respect to FIG. 4.

In an embodiment, the token associated with the event is active only for a predefined duration associated with the event. For instance, according to such embodiment the token is activated at a fixed beginning time associated with the event and is deactivated at a fixed ending time associated with the event, regardless of extenuating circumstances such as unexpected event delays or pauses during the event. The predefined duration optionally is determined by the streaming platform or the event host. In an alternative embodiment, the token is dynamically active for a duration of the event as determined by activity status of the event. For instance, according to such alternative embodiment, from the purview of the streaming platform application the token is activated only during event activity, as determined based upon image recognition, voice recognition, etc., and is deactivated immediately upon conclusion of event activity, regardless of projected ending time. Furthermore, according to such alternative embodiment, the token optionally is temporarily deactivated during pause(s) or intermission(s) in the course of the event. Such pause(s) or intermission(s) optionally are determined based upon image recognition, voice recognition, etc.

In an embodiment, the token associated with the event is a barcode. Such barcode may be a two-dimensional barcode or a three-dimensional barcode such as a Quick Response Code (QR code). According to such embodiment, the streaming platform application determines that the unsanctioned streaming content includes the token according to step 220 by detecting the barcode within the unsanctioned streaming content via a scanning application. Such scanning application may include pattern matching and/or a form of image recognition capable of interpreting barcode details. Additionally or alternatively, the streaming platform application detects the barcode within the unsanctioned streaming content via an image recognition application. In a further embodiment, the token is a visual representation. Such visual representation may be, inter alia, a photograph, a graphic, or a symbol. According to such further embodiment, the streaming platform application determines that the unsanctioned streaming content includes the token according to step 220 by detecting the visual representation within the unsanctioned streaming content via an image recognition application. Furthermore, according to such embodiment, the visual representation may be distinct from other aspects at the event site such that it is unequivocally identifiable.

Responsive to determining at step 220 that the selected portion of the unsanctioned streaming content does not include the token associated with the event, the streaming platform application proceeds directly to step 230. Responsive to determining at step 220 that the selected portion of the unsanctioned streaming content includes the token, the streaming platform application proceeds to step 225, where the streaming platform application regulates the unsanctioned streaming content according to a media infringement policy implemented by the streaming platform. In the context of the various embodiments described herein, a media infringement policy includes one or more predefined rules and/or sub-policies for managing unsanctioned streaming content responsive to determining that such content is unauthorized by the event host. The media infringement policy optionally incorporates aspects of a service level agreement (SLA) policy. Additionally, the media infringement policy optionally incorporates one or more aspects of a streaming management request as provided to the streaming platform application by the event host. A streaming management request in the context of the various embodiments is further described herein with respect to FIG. 3. Furthermore, the media infringement policy optionally distinguishes "fair use" scenarios from unsanctioned streaming content such that instances of "fair use" are permitted in accordance with relevant legal interpretation. For instance, in certain cases the streaming platform application may limit regulation of the unsanctioned streaming content or portions thereof upon determining presence of satirical elements or other additional aspects originally created or uniquely perceived by the streaming contributor. In an embodiment, according to step 225 the streaming platform application regulates only the portion of unsanctioned streaming content selected at step 220. Alternatively, according to step 225 the streaming platform application regulates the entirety of the unsanctioned streaming content available at the time of regulation. Following any regulation(s) implemented at step 225 based upon the selected portion analyzed at step 220, the streaming platform application proceeds to step 230.

In an embodiment, the streaming platform application regulates the unsanctioned streaming content at step 225 according to the media infringement policy by inserting at least one promotional segment into the unsanctioned streaming content. According to such embodiment, responsive to determining at step 220 that the unsanctioned streaming content includes the token, at step 225 the streaming platform application regulates the unsanctioned streaming content by dynamically negotiating placement of at least one promotional segment, such as at least one advertising content segment and/or at least one informational content segment, as a condition for permitting dissemination of the unsanctioned streaming content to continue. According to such embodiment, the streaming platform application optionally transmits to the streaming client system of the streaming contributor an alert indicating lack of authorization for the unsanctioned streaming content along with one or more proposed terms with respect to insertion of at least one promotional segment. The streaming platform application facilitates display of the alert and the one or more proposed terms via the streaming client interface associated with the streaming contributor. Alternatively, subsequent to detecting the unsanctioned streaming content according to step 215 but prior to determining inclusion of the token within any unsanctioned streaming content according to step 220, the streaming platform application optionally pre-negotiates with the streaming contributor to determine at least one option for placement of at least one promotional segment in the event that the streaming platform application detects unsanctioned streaming content including the token.

In a further embodiment, the streaming platform application regulates the unsanctioned streaming content at step 225 according to the media infringement policy by disabling the unsanctioned streaming content for a predefined blockage period. The predefined blockage period optionally is determined by the streaming platform application or the event host. According to such further embodiment, disabling the unsanctioned streaming content optionally includes applying a content blocking mechanism for the predefined blockage period. In the event that the unsanctioned streaming content is available for client access on the streaming platform, the streaming platform application may remove streaming client access to the unsanctioned streaming content and optionally may replace the unsanctioned streaming content available via the streaming platform with a message indicating blocked content due to an intellectual property rights and/or a privacy violation. The streaming platform application removes streaming client access by blocking access to the unsanctioned streaming content on any server and/or streaming service associated with the streaming platform. In the event that the unsanctioned streaming content is available for client access on another streaming platform, the streaming platform application optionally transmits a request to the other streaming platform requesting that access to the unsanctioned streaming content be removed for the predefined blockage period. According to such further embodiment, optionally the streaming platform application disables any account of the streaming contributor associated with the streaming platform and/or requests disablement of any account of the streaming contributor associated with another streaming platform. According to such further embodiment, the predefined blockage period may last until whenever the event concludes. Alternatively, according to such further embodiment, the predefined blockage period may last a predesignated amount of time, e.g., regardless of the precise time at which the event concludes. The streaming platform application may proceed to step 230 upon expiration of the predefined blockage period according to such further embodiment.

In a further embodiment, the streaming platform application regulates the unsanctioned streaming content at step 225 according to the media infringement policy by transmitting to the streaming client system of the streaming contributor a notification indicating blockage of the unsanctioned streaming content upon expiration of a predefined warning period, e.g., from the time of notification. The predefined warning period optionally is determined by the streaming platform application or the event host. According to such further embodiment, the notification optionally includes an alert or a message initiated from the streaming platform application and displayed via the streaming client interface associated with the streaming contributor. Such alert or message optionally includes one or more audiovisual warning signals. According to such further embodiment, the notification optionally indicates indefinite blockage of the unsanctioned streaming content upon expiration of the predefined warning period. For instance, the streaming platform application may transmit to the streaming client system of the streaming contributor an alert indicating imminent indefinite blockage of the unsanctioned streaming content upon expiration of a two-minute time period from the time of alert notification, i.e., starting two minutes from the time of alert notification. Alternatively, according to such further embodiment, the notification indicates blockage of the unsanctioned streaming content for a predetermined amount of time upon expiration of the predefined warning period. The predetermined amount of time optionally is designated by the streaming platform application or the event host. For instance, the streaming platform application may transmit to the streaming client system of the streaming contributor an alert indicating imminent blockage of the unsanctioned streaming content for a period of one hour upon expiration of a one-minute time period from the time of alert notification, i.e., starting one minute from the time of alert notification. The streaming platform application may proceed to step 230 once the unsanctioned streaming content is blocked for the predetermined amount of time according to such alternative.

In an additional embodiment, the streaming platform application regulates the unsanctioned streaming content at step 225 according to the media infringement policy by blocking the unsanctioned streaming content until the streaming contributor is beyond a predefined geographic range associated with the event. The predefined geographic range optionally is determined by the respective location(s) of at least one artifact placed at the site of the event. For instance, the predefined geographic range may encompass any location within a one-hundred-yard radius of an artifact among the at least one artifact. According to such additional embodiment, the streaming platform application optionally immediately blocks the unsanctioned streaming content, in which case the streaming platform application optionally transmits to the streaming client system of the streaming contributor a notification (e.g., displayed via the streaming client interface) indicating immediate blockage of the unsanctioned streaming content until the streaming contributor moves beyond the predefined geographic range. Alternatively, the streaming platform application optionally blocks the unsanctioned streaming content upon confirming that the streaming contributor remains within the predefined geographic range upon expiration of the predefined warning period. According to such alternative, the streaming platform application provides to the streaming client system of the streaming contributor a notification (e.g., displayed via the streaming client interface) indicating an option to avoid any blockage of the unsanctioned streaming content by moving beyond the predefined geographic range prior to expiration of the predefined warning period. According to such additional embodiment, the streaming platform application optionally determines whether the streaming contributor is beyond the predefined geographic range based upon the location of the streaming client system of the streaming contributor. The streaming platform application optionally determines absolute location of the streaming client system of the streaming contributor based upon GPS location information. Additionally or alternatively, the streaming platform application optionally determines the location of the streaming client system of the streaming contributor based upon a location of such system relative to the at least one artifact. Placement of at least one artifact at the event site in the context of the various embodiments is further described herein with respect to FIG. 3. Additionally or alternatively, the streaming platform application optionally determines whether the streaming contributor is beyond the predefined geographic range by proceeding to step 230 and analyzing any further available portion of the unsanctioned streaming content, as further described herein. In the event that a source other than the streaming contributor captures the unsanctioned streaming content (in which case the streaming contributor obtains from such source the unsanctioned streaming content for dissemination), the regulation applies until the streaming contributor facilitates geographic range compliance of the streaming client system via which the unsanctioned streaming content is captured.

In a further embodiment, the streaming platform application regulates the unsanctioned streaming content at step 225 according to the media infringement policy by blocking the unsanctioned streaming content until the streaming contributor changes a direction and/or an angle at which the unsanctioned streaming content is captured by a predetermined degree. The predetermined degree optionally is set by the streaming platform application or the event host. According to such further embodiment, the streaming platform application optionally immediately blocks the unsanctioned streaming content, in which case the streaming platform application optionally transmits to the streaming client system of the streaming contributor a notification (e.g., displayed via the streaming client interface) indicating immediate blockage of the unsanctioned streaming content until the streaming contributor changes the direction and/or the angle of capture by the predetermined degree. Alternatively, the streaming platform application optionally blocks the unsanctioned streaming content upon confirming that the streaming contributor has failed to change the direction and/or the angle of capture by the predetermined degree upon expiration of the predefined warning period. According to such alternative, the streaming platform application provides to the streaming client system of the streaming contributor a notification (e.g., displayed via the streaming client interface) indicating an option to avoid any blockage of the unsanctioned streaming content by changing the direction and/or the angle of capture by the predetermined degree prior to expiration of the predefined warning period.

In accordance with such further embodiment, the streaming platform application may prevent the streaming contributor from recording prime aspects of the event in a constantly fixed position, which may violate the media infringement policy. The streaming platform application optionally determines whether the streaming contributor changes the direction and/or the angle of capture as required by the streaming platform application by proceeding to step 230 and analyzing any further available portion of the unsanctioned streaming content. In the event that a source other than the streaming contributor captures the unsanctioned streaming content (in which case the streaming contributor obtains from such source the unsanctioned streaming content for dissemination), the regulation applies until the streaming contributor facilitates direction and/or angle of capture compliance of the streaming client system via which the unsanctioned streaming content is captured.

At step 230, the streaming platform application determines whether at least one further portion of the unsanctioned streaming content is available, e.g., whether there is at least one further portion (e.g., set of frames) of the unsanctioned streaming content available for analysis. Responsive to determining that at least one further portion of the unsanctioned streaming content is available, the streaming platform application returns to step 215 to select an additional portion of the unsanctioned streaming content. In an embodiment, the additional portion includes live content newly captured in real time. Additionally or alternatively, the additional portion includes previously recorded content that was not previously selected by the streaming platform application. Responsive to determining that no further portion of the unsanctioned streaming content is available, the streaming platform application proceeds to the end of the method 200.

As reflected in certain embodiments described herein, through analysis of at least one further selected portion of the unsanctioned streaming content, the streaming platform application may enhance, maintain, or reduce any regulation of the unsanctioned streaming content resulting from the originally selected portion of the unsanctioned streaming content. For instance, through analysis of at least one further selected portion of the unsanctioned streaming content, the streaming platform application may regulate the unsanctioned streaming content further in the event that the streaming contributor continues to violate the policy subsequent to regulation of the unsanctioned streaming content based upon the originally selected portion. In another instance, through analysis of at least one further selected portion of the unsanctioned streaming content, the streaming platform application may confirm that the streaming contributor has properly adhered to any condition(s) imposed through regulation of the unsanctioned streaming content based upon the originally selected portion and accordingly may reduce regulation. By analyzing multiple content portions in the context of the method 200, the streaming platform application may calibrate regulation of the unsanctioned streaming content.

Figure 3:
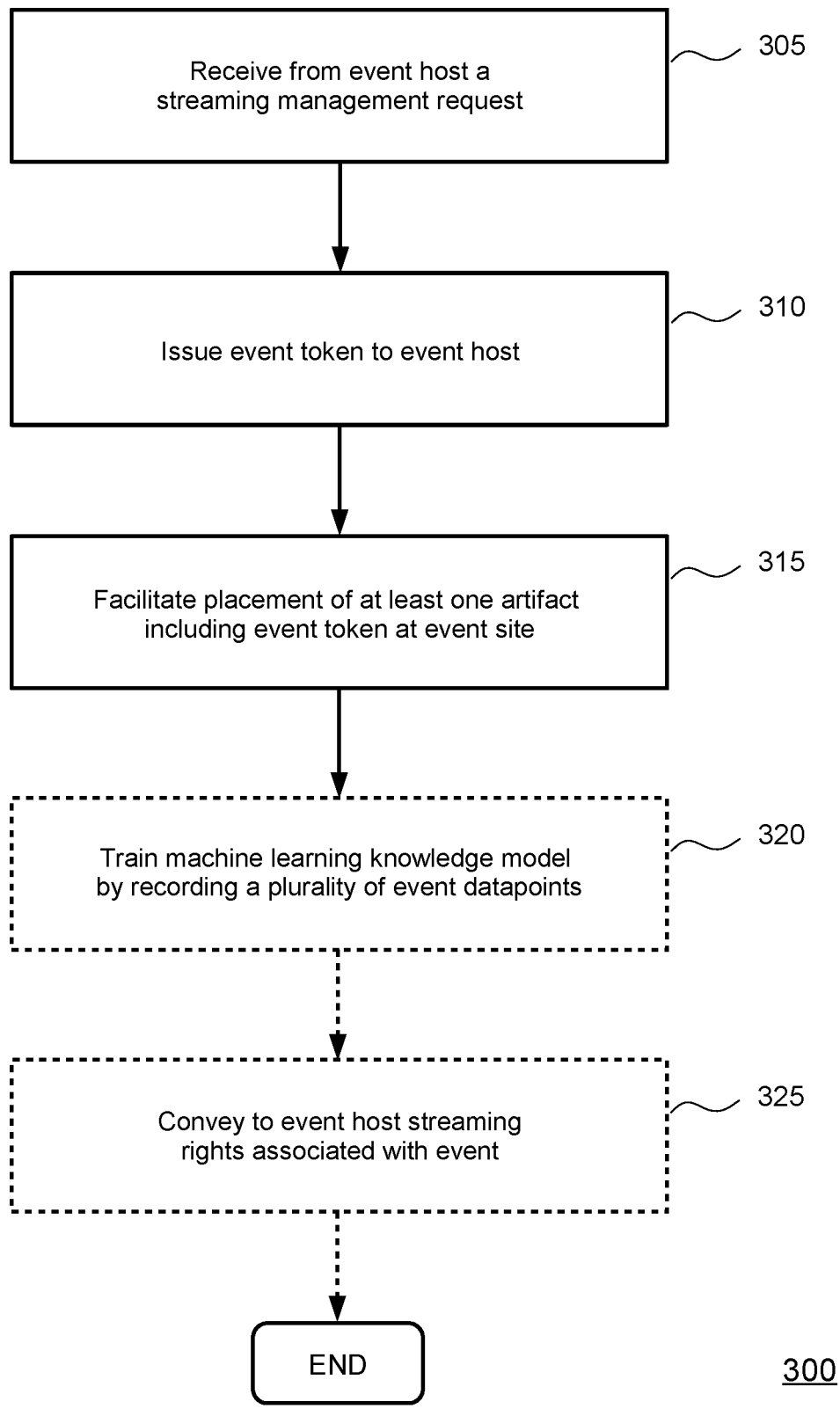
FIG. 3 illustrates a method of registering an event with a streaming platform, according to one or more embodiments.

FIG. 3 illustrates a method 300 of registering the event with the streaming platform. The method 300 provides one or more example embodiments with respect to step 205 of the method 200. The method 300 begins at step 305, where the streaming platform application receives from the event host a streaming management request. The streaming management request optionally outlines one or more host preferences with regard to handling unsanctioned streaming content. The one or more host preferences optionally include a policy and/or any predefined rules for handling unsanctioned streaming content. At step 310, the streaming platform application issues the token associated with the event to the event host. By receiving the issued token, any device associated with the host may stream the event including content having the token without triggering regulation according to the various embodiments described herein. Optionally the streaming platform application may record details regarding any such device associated with the host. In an embodiment, the event host may select or otherwise configure one or more characteristics associated with the token, including shape, form, etc.

At step 315, the streaming platform application facilitates placement of at least one artifact including the token at the event site. In an embodiment, the streaming platform application facilitates placement of one or more of the at least one artifact within filming range of one or more event aspects, optionally at multiple filming angles with respect to the one or more event aspects. Filming range in the context of such embodiment may include any location at the event site within a predesignated distance of any potential activity associated with the event. The predesignated distance optionally is defined by the streaming platform application or the event host. In a further embodiment, the event host, an event administrator, or an administrator associated with the streaming platform determines the location(s) of the at least one artifact at the event site and/or coordinates production of the at least one artifact. Example event sites including respective artifacts and tokens are described with respect to FIGS. 7-8.

The streaming platform application optionally facilitates placement of the at least one artifact by facilitating printing thereof. In such case the streaming platform application facilitates two-dimensional printing and/or three-dimensional printing of the at least one artifact using a physical medium such as paper, cardboard, plastic, metal, etc. Additionally, the token is superimposed upon the physical medium via printing, painting, drawing, etc. The physical medium optionally is posted, mounted, or otherwise displayed at the event site. Furthermore, the streaming platform application optionally sends image data related to the at least one artifact and the token to a printing component, and the printing component optionally prints some or all aspects of the at least one artifact with the token superimposed thereon. The streaming platform application optionally provides to the event host or an event site administrator instructions directing placement of the at least one printed artifact at one or more specified event site locations based upon the nature of anticipated event activities.

Additionally or alternatively, the streaming platform application facilitates placement of at least one artifact by facilitating digital projection thereof. In such case, the token may be a multi-dimensional barcode or other image within a digital projection. Optionally the streaming platform application facilitates digital projection of the at least one artifact upon a surface at the event site, e.g., a wall, a door, or a screen. Such digital projection optionally includes visible light viewable via the human eye. Alternatively, such digital projection optionally includes infrared light invisible to the human eye but capable of being captured via image processing hardware of a streaming source (e.g., a camera or other capture device included within the streaming client system of the streaming contributor discussed with respect to the method 200). The streaming platform application optionally sends image data related to the at least one artifact and the token to a digital projection component at the event site, and such digital projection component optionally projects some or all aspects of the at least one artifact including the token at the event site during event activities and/or during a predetermined timeframe set for the event. The streaming platform application optionally provides to the event host or an event site administrator instructions directing digital projection of the at least one artifact at one or more specified event site locations based upon the nature of anticipated event activities.

Optionally, at step 320 the streaming platform application trains a machine learning knowledge model associated with the streaming platform by recording a plurality of datapoints associated with the event. In an embodiment, the event datapoints include data with regard to the event site. According to such embodiment, the streaming platform application records the plurality of event datapoints by storing datapoints related to aspects of the event site. The streaming platform application stores such event site datapoints among knowledge base data (e.g., knowledge base data 157) associated with a representation of the machine learning knowledge model (e.g., machine learning knowledge model representation 151). Specifically, the streaming platform application optionally stores a plurality of image datapoints with respect to a plurality of possible images associated with the event. For instance, if the event site is a sports arena, the streaming platform application may store datapoints related to physical characteristics of the sports arena and/or images associated with a typical sporting event held in the sports arena. In a further embodiment, the event datapoints include data with regard to the event token. According to such further embodiment, the streaming platform application records the plurality of event datapoints by storing among the knowledge base data datapoints related to aspects of the token, e.g., token proportions, token sizes, token colors, token transparencies, token forms, etc., and/or multiple token configurations. For instance, if the token is a symbol, the streaming platform application may store aspects with respect to such symbol, including proportions, possible configurations, and possible colors of such symbol.

Optionally, at step 325 the streaming platform application conveys to the host streaming rights associated with the event. In an embodiment, the streaming platform application provides the event host an option to convey the streaming rights to one or more other parties, in which case the streaming platform application may issue the event token to the one or more other parties. According to such embodiment, the event host may sell streaming rights and/or promotional rights to the one or more other parties such that they may produce and distribute one or more sanctioned event streams in exchange for royalties and/or other consideration. According to such embodiment, one or more sanctioned event streams optionally include predefined promotional intervals for one or more advertising segments, informational segments, etc. Additionally or alternatively, one or more sanctioned event streams optionally include promotional intervals dynamically determined by the streaming platform application based upon pause(s) or intermission(s) during the event. The streaming platform application may identify such pause(s) or intermission(s) based upon image recognition (e.g., sports players absent from the field at the event site, a singers/performers offstage at the event site, etc.), audio recognition (e.g., vocal announcement of an event timeout/intermission), and/or as designated by the event host and/or the one or more other parties granted streaming rights. The streaming platform application may facilitate image processing for purposes of image recognition by initiating an API call to an application having image processing capabilities, e.g., a local server-based image processing application and/or a cloud-based image processing application. The streaming platform application may facilitate audiovisual processing for purposes of audio recognition by initiating an API call to an application having audiovisual processing capabilities, e.g., a local server-based audiovisual processing application and/or a cloud-based audiovisual processing application. Optionally, the streaming platform application provides streaming client access to content broadcasted from the event site during pause(s) or intermission(s), e.g., in a reduced screen portion of a streaming client interface in conjunction with promotional content. Accordingly, the streaming platform application may provide streaming clients an option to view the event site during pause(s) or intermission(s).

Figure 4:
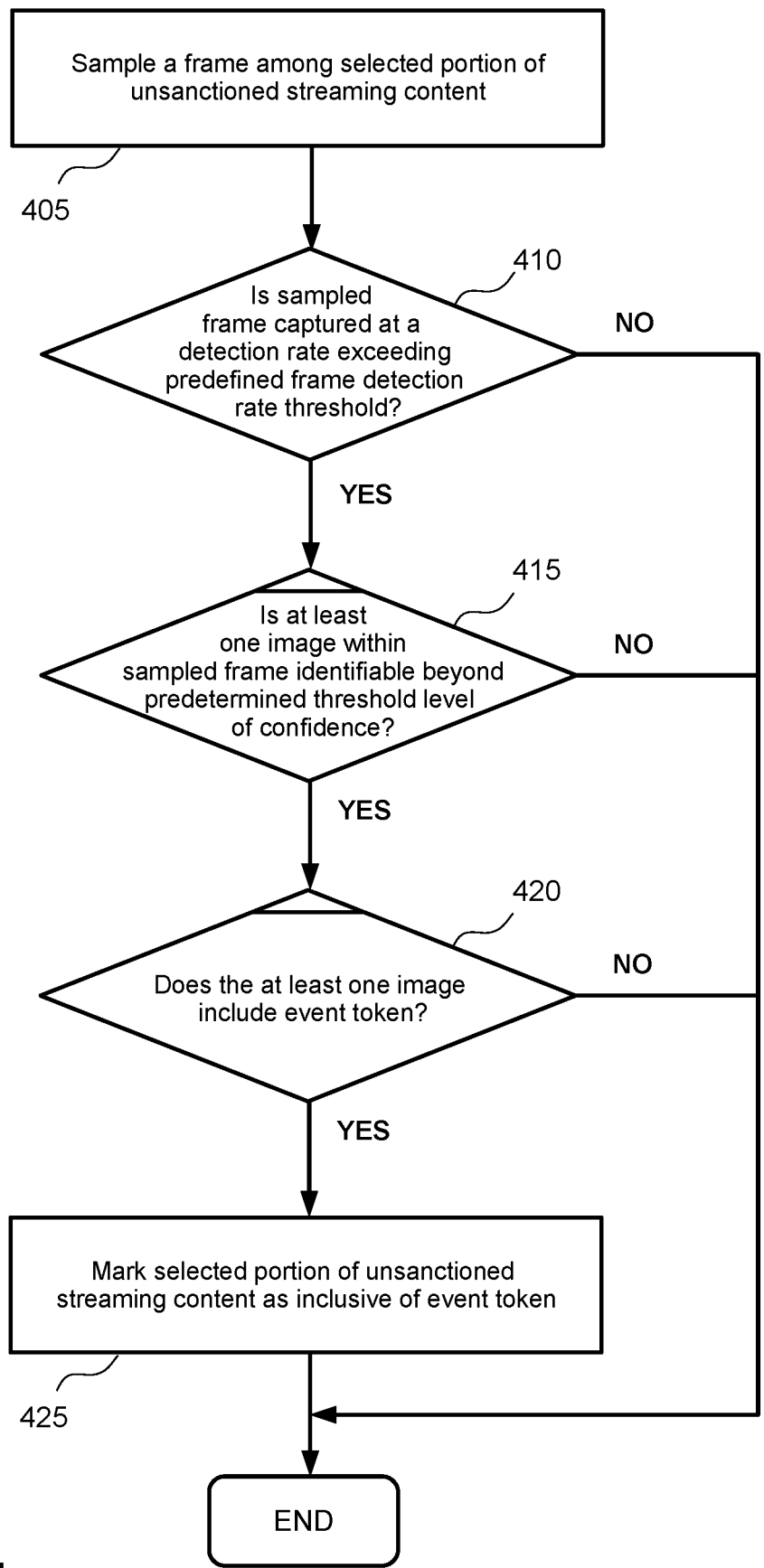
FIG. 4 illustrates a method of determining whether unsanctioned streaming content includes a token associated with an event, according to one or more embodiments.

FIG. 4 illustrates a method 400 of determining whether the selected portion of the unsanctioned streaming content includes the event token. The method 400 provides one or more example embodiments with respect to step 220 of the method 200. The method 400 begins at step 405, where the streaming platform application samples a frame among the selected portion of the unsanctioned streaming content. At step 410, the streaming platform application determines whether the sampled frame among the selected portion of the unsanctioned streaming content is captured at a detection rate exceeding a predefined frame detection rate threshold. In an embodiment, the predefined frame detection rate threshold is defined in terms of a number of frames per second. In a further embodiment, the streaming platform application provides the event host an option to determine the predefined frame detection rate threshold. In a further embodiment, for purposes of server resource efficiency, the streaming platform application optionally designates a relatively higher predefined frame detection rate threshold for events having comparatively more motion and optionally designates a relatively lower frame detection rate threshold for events having comparatively less motion. Additionally or alternatively, the streaming platform application optionally imposes limits upon the predefined frame detection rate threshold based upon performance of the streaming platform server and/or one or more associated servers.

Responsive to determining at step 410 that the sampled frame among the selected portion of the unsanctioned streaming content is not captured at a detection rate exceeding a predefined frame detection rate threshold, the streaming platform application may proceed to the end of the method 400. Responsive to determining at step 410 that the sampled frame among the selected portion of the unsanctioned streaming content is captured at a detection rate exceeding a predefined frame detection rate threshold, at step 415 the streaming platform application determines whether at least one image within the sampled frame is identifiable beyond a predetermined threshold level of confidence. The predetermined threshold level of confidence optionally is defined by the streaming platform application. Alternatively, the streaming platform application provides the event host an option to define the predetermined threshold level of confidence. In an embodiment, the predetermined level of confidence is represented as a percentage between 0% and 100% and/or as a decimal value between 0 and 1. In a further embodiment, the at least one image includes three-dimensional data aspects, e.g., in a matrix representation. According to such further embodiment, the at least one image optionally includes audiovisual data, barcode data, and/or metadata related thereto. Such audiovisual data optionally includes pixel data and/or audio data. Such barcode data optionally includes data transmitted via one or more digital projections. In a further embodiment, the streaming platform application determines whether at least one image within the sampled frame is identifiable through execution of an artificial intelligence machine learning algorithm via the machine learning knowledge model associated with the streaming platform. A method with regard to determining whether at least one image within the sampled frame is identifiable beyond the predetermined threshold level of confidence in accordance with step 415 via machine learning is described with respect to FIG. 5.

Responsive to determining at step 415 that at least one image within the sampled frame is not identifiable beyond a predetermined threshold level of confidence, the streaming platform application may proceed to the end of the method 400. Responsive to determining at step 415 that at least one image within the sampled frame is identifiable beyond a predetermined threshold level of confidence, at step 420 the streaming platform application determines whether the at least one image includes the event token. According to step 420, the streaming platform application optionally determines whether the entirety of the token or a portion of the token is embedded within the frame. In an embodiment, responsive to determining that the at least one image includes a portion of the token (but not the entirety of the token), optionally the streaming platform application takes additional measures to confirm presence of the token. In a further embodiment, the streaming platform application takes additional measures to confirm presence of the token even if the least one image includes the entirety of the token. According to such embodiments, upon determining that the frame includes the token, optionally the streaming platform application analyzes at least one additional sampled frame in the selected portion of the unsanctioned streaming content in accordance with steps 410, 415, and 420 at a designated time following analysis of the sampled frame in order to confirm that the at least one image includes the token. In a further embodiment, responsive to determining that the at least one image includes a portion of the token (but not the entirety of the token), optionally the streaming platform application determines whether the portion of the token is identifiable beyond the predetermined threshold level of confidence. In another embodiment, in the event that the token is a digital projection, the streaming platform application optionally determines whether the at least one image within the frame includes the token by determining whether the at least one image includes data associated with such digital projection, e.g., barcode data or any metadata related to digital projection. In a further embodiment, the streaming platform application determines whether the at least one image includes the token through execution of an artificial intelligence machine learning algorithm via the machine learning knowledge model associated with the streaming platform. A method with regard to determining whether the at least one image includes the token in accordance with step 420 via machine learning is described with respect to FIG. 6.

Responsive to determining at step 420 that the at least one image does not include the event token, the streaming platform application may proceed to the end of the method 400. Responsive to determining that the at least one image includes the event token, at step 425 the streaming platform application marks the selected portion of the unsanctioned streaming content as inclusive of the token. Based upon marking the selected portion, the streaming platform application optionally proceeds to regulate the unsanctioned streaming content in accordance with step 225 of the method 200.

Figure 5:
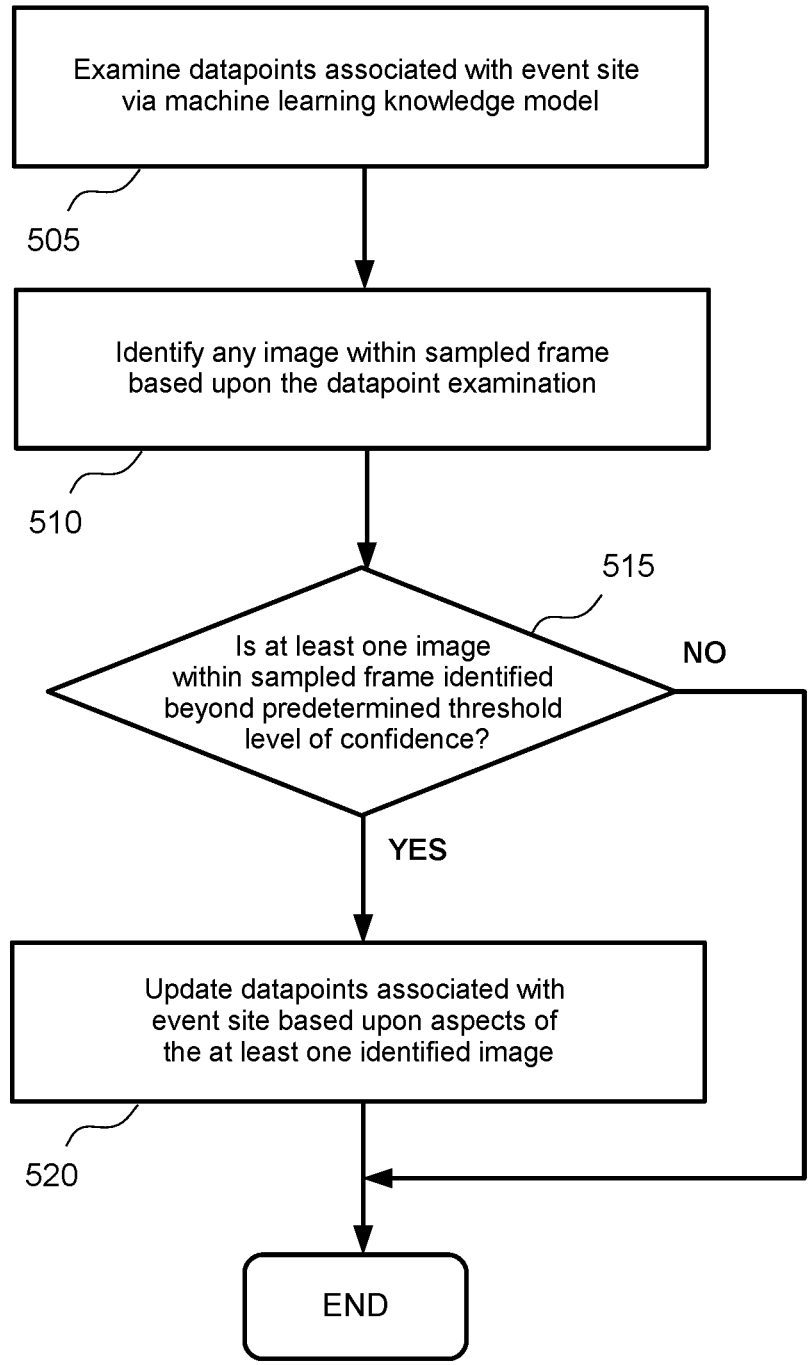
FIG. 5 illustrates a method of determining whether at least one image within a sampled frame of unsanctioned streaming content is identifiable, according to one or more embodiments.

FIG. 5 illustrates a method 500 of determining whether at least one image within the sampled frame is identifiable beyond the predetermined threshold level of confidence. The method 500 provides one or more example embodiments with respect to step 415 of the method 400. The streaming platform application executes one or more steps of the method 500 by executing a machine learning algorithm via the machine learning knowledge model. The method 500 begins at step 505, where the streaming platform application examines datapoints that are associated with the event site via the machine learning knowledge model. In an embodiment, the streaming platform application accesses the event site datapoints stored among the knowledge base data. At step 510, the streaming platform application identifies any image within the sampled frame based upon the datapoint examination. The streaming platform application provides a level of confidence with respect to each image identified at step 510.

At step 515, the streaming platform application determines whether at least one image within the sampled frame is identified beyond the predetermined threshold level of confidence. Responsive to determining that no image within the sampled frame is identified beyond the predetermined threshold level of confidence, the streaming platform application may proceed to the end of the method 500. Responsive to determining that at least one image within the sampled frame is identified beyond the predetermined threshold level of confidence, at step 520 the streaming platform application updates the event site datapoints stored within the knowledge base data based upon aspects of the at least one identified image. Such aspects may include physical characteristics associated with the at least one identified image and/or any classification(s) applicable to one or more of the at least one identified image. For example, the streaming platform application may determine that a first image is identifiable within the sampled frame with a 40% level of confidence and that a second image is identifiable within the sampled frame with a 90% level of confidence. Assuming that the predetermined threshold level of confidence is 85%, the streaming platform application only identifies the second image beyond the predetermined threshold level of confidence in accordance with step 515, and hence the streaming platform application updates the event site datapoints among the knowledge base data only based upon aspects of the second image in accordance with step 520.

Figure 6:
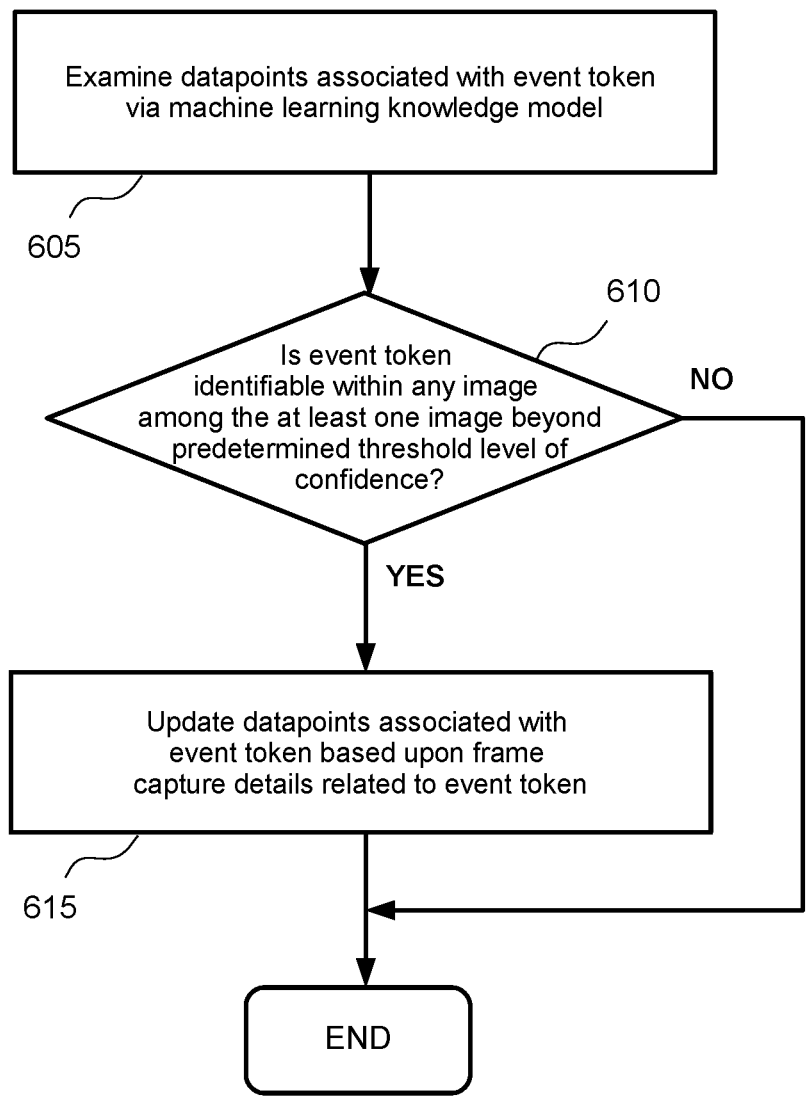
FIG. 6 illustrates a method of determining whether at least one image within a sampled frame of unsanctioned streaming content includes a token associated with an event, according to one or more embodiments.

FIG. 6 illustrates a method 600 of determining whether the at least one image includes the event token. The method 600 provides one or more example embodiments with respect to step 420 of the method 400. The streaming platform application executes one or more steps of the method 600 by executing a machine learning algorithm via the machine learning knowledge model. The method 600 begins at step 605, where the streaming platform application examines datapoints associated with the event token via the machine learning knowledge model. In an embodiment, the streaming platform application accesses the event token datapoints stored among the knowledge base data. At step 610, the streaming platform application determines, based upon the datapoint examination, whether the token is identifiable within any image among the at least one image beyond the predetermined threshold level of confidence. Responsive to determining, based upon the datapoint examination, that the token is not identifiable within any image among the at least one image beyond the predetermined threshold level of confidence, the streaming platform application may proceed to the end of the method 600. Responsive to determining, based upon the datapoint examination, that the token is identifiable within any image among the at least one image beyond the predetermined threshold level of confidence, at step 615 the streaming platform application updates the event token datapoints stored within the knowledge base data based upon frame capture details related to the token, including camera angle, relative size of the token within the frame, configuration of the token, etc.

Figure 7:
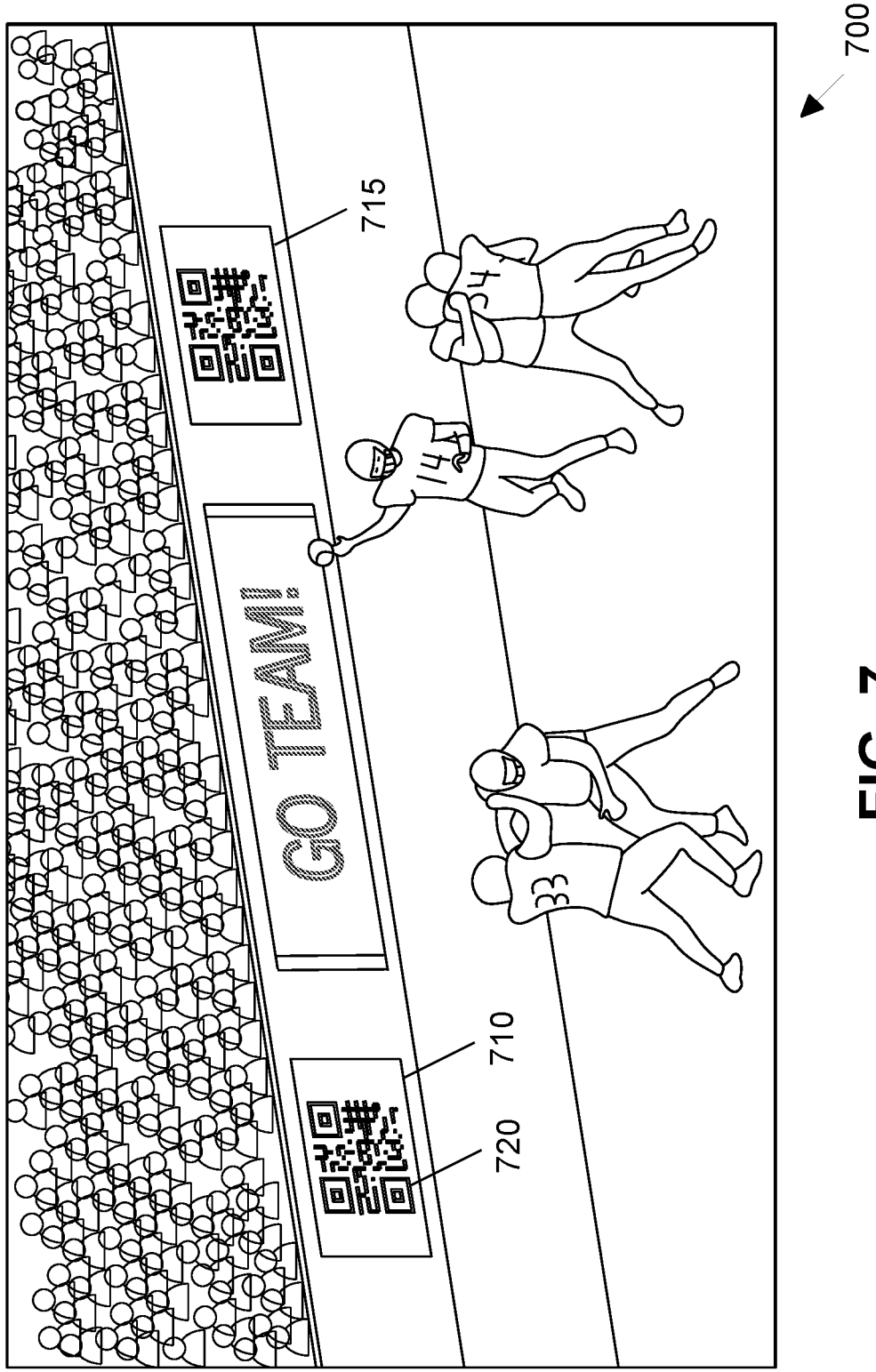
FIG. 7 depicts an example event site in the context of the various embodiments described herein.

FIG. 7 depicts an event site 700 in the context of the various embodiments described herein. Event site 700 is merely an illustrative example and is not intended to be limiting with respect to managing streaming content as described herein. Event site 700 is a sports field including artifacts 710 and 715. Each of artifacts 710 and 715 includes event token 720. While event site 700 includes artifacts 710 and 715, event site 700 alternatively could include only one of the artifacts 710 and 715 or could include one or more additional artifacts. Furthermore, while event token 720 is a three-dimensional QR code, event token 720 alternatively may be another form of token representation, such as a barcode, a symbol, or another type of image not including a barcode or symbol.

Figure 8:
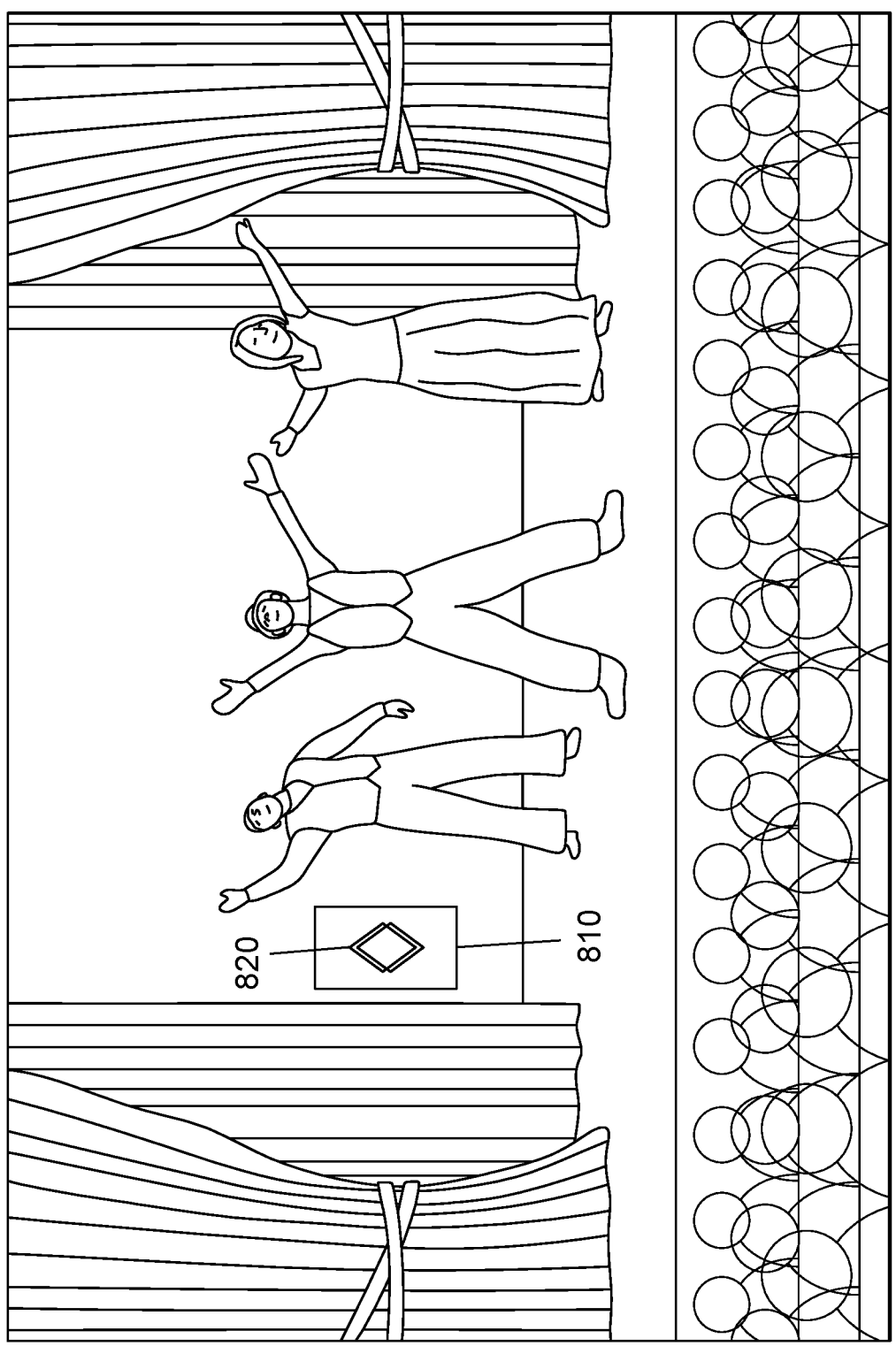
FIG. 8 depicts a further example event site in the context of the various embodiments described herein.

FIG. 8 depicts an event site 800 in the context of the various embodiments described herein. Event site 800 is merely an illustrative example and is not intended to be limiting with respect to managing streaming content as described herein. Event site 800 is a theater stage including artifact 810. Artifact 810 includes event token 820. While event site 800 includes artifact 810, event site 800 alternatively could include one or more additional artifacts. Furthermore, while event token 820 is a symbol, event token 820 alternatively may be another form of token representation, such as a barcode, another type of symbol, or another type of image not including a barcode or symbol.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   registering an event with a streaming platform, wherein registering the event comprises facilitating placement of at least one artifact including a token associated with the event by facilitating printing or digital projection of the at least one artifact onto a locale at a site of the event separate from any portion of prerecorded digital content;
   detecting from a client system of a streaming contributor unsanctioned streaming content captured from the event;
   determining whether a selected portion of the unsanctioned streaming content includes the token as printed or digitally projected via the at least one artifact; and
   responsive to determining that the selected portion of the unsanctioned streaming content includes the token, regulating the unsanctioned streaming content according to a media infringement policy implemented by the streaming platform, wherein the token is activated only during event activity, the event activity determined based upon image recognition or voice recognition.

2. The computer-implemented method of claim 1, wherein the token is a barcode, and wherein determining that the unsanctioned streaming content includes the token comprises detecting the barcode within the unsanctioned streaming content via a scanning application.

3. The computer-implemented method of claim 1, wherein the token is a visual representation, and wherein determining that the unsanctioned streaming content includes the token comprises detecting the visual representation within the unsanctioned streaming content via an image recognition application.

4. The computer-implemented method of claim 1, wherein registering the event further comprises:
   receiving from a host of the event a streaming management request; and
   issuing the token to the host.

5. The computer-implemented method of claim 4, wherein registering the event further comprises training a machine learning knowledge model associated with the streaming platform by recording a plurality of datapoints associated with the event.

6. The computer-implemented method of claim 4, wherein registering the event further comprises conveying to the host streaming rights associated with the event.

7. The computer-implemented method of claim 1, wherein determining whether the selected portion of the unsanctioned streaming content includes the token comprises:
   responsive to determining that a sampled frame among the unsanctioned streaming content is captured at a detection rate exceeding a predefined frame detection rate threshold, determining whether at least one image within the sampled frame is identifiable beyond a predetermined threshold level of confidence; and
   responsive to determining that at least one image within the sampled frame is identifiable beyond the predetermined threshold level of confidence, determining whether the at least one image includes the token.

8. The computer-implemented method of claim 7, wherein determining whether at least one image within the sampled frame is identifiable beyond the predetermined threshold level of confidence comprises:
   examining datapoints associated with a site of the event via a machine learning knowledge model associated with the streaming platform;
   identifying any image within the sampled frame based upon the datapoint examination; and
   responsive to determining that at least one image within the sampled frame is identified beyond the predetermined threshold level of confidence, updating the datapoints associated with the site of the event based upon aspects of the at least one identified image.

9. The computer-implemented method of claim 7, wherein determining whether the at least one image includes the token comprises:
   examining datapoints associated with the token via a machine learning knowledge model associated with the streaming platform; and
   responsive to determining based upon the datapoint examination that the token is identifiable within any image among the at least one image beyond the predetermined threshold level of confidence, updating the datapoints associated with the token based upon frame capture details related to the token.

10. The computer-implemented method of claim 1, wherein regulating the unsanctioned streaming content comprises negotiating placement of at least one promotional segment into the unsanctioned streaming content.

11. The computer-implemented method of claim 1, wherein regulating the unsanctioned streaming content comprises disabling the unsanctioned streaming content for a predefined blockage period.

12. The computer-implemented method of claim 1, wherein regulating the unsanctioned streaming content comprises transmitting to the client system of the streaming contributor a notification indicating blockage of the unsanctioned streaming content upon expiration of a predefined warning period.

13. The computer-implemented method of claim 1, wherein the token is activated at a fixed beginning time associated with the event and is deactivated at a fixed ending time associated with the event.

14. The computer-implemented method of claim 1, wherein the token is deactivated immediately upon conclusion of the event activity.

15. The computer-implemented method of claim 1, wherein the token is temporarily deactivated during a pause or intermission in the course of the event, the pause or intermission determined based upon image recognition or voice recognition.

16. The computer-implemented method of claim 1, wherein regulating the unsanctioned streaming content comprises blocking the unsanctioned streaming content until the streaming contributor changes a direction or an angle from which the unsanctioned streaming content is captured from the event by a predetermined degree.

17. The computer-implemented method of claim 1, wherein regulating the unsanctioned streaming content comprises blocking the unsanctioned streaming content until the streaming contributor is capturing beyond a predefined geographic range associated with the event.

18. A computer program product comprising a computer readable storage medium having program instructions embodied therewith, the program instructions executable by a computing device to cause the computing device to:
   register an event with a streaming platform, wherein registering the event comprises facilitating placement of at least one artifact including a token associated with the event by facilitating printing or digital projection of the at least one artifact onto a locale at a site of the event separate from any portion of prerecorded digital content;
   detect from a client system of a streaming contributor unsanctioned streaming content captured from the event;
   determine whether a selected portion of the unsanctioned streaming content includes the token as printed or digitally projected via the at least one artifact; and
   responsive to determining that the selected portion of the unsanctioned streaming content includes the token, regulate the unsanctioned streaming content according to a media infringement policy implemented by the streaming platform, wherein the token is activated only during event activity, the event activity determined based upon image recognition or voice recognition.

19. A system comprising:
   a processor; and
   a memory storing an application program, which, when executed on the processor, performs an operation comprising:
      registering an event with a streaming platform, wherein registering the event comprises facilitating placement of at least one artifact including a token associated with the event by facilitating printing or digital projection of the at least one artifact onto a locale at a site of the event separate from any portion of prerecorded digital content;
      detecting from a client system of a streaming contributor unsanctioned streaming content captured from the event;
      determining whether a selected portion of the unsanctioned streaming content includes the token as printed or digitally projected via the at least one artifact; and
      responsive to determining that the selected portion of the unsanctioned streaming content includes the token, regulating the unsanctioned streaming content according to a media infringement policy implemented by the streaming platform, wherein the token is activated only during event activity, the event activity determined based upon image recognition or voice recognition.

* * * * *